United States Patent
Glista et al.

(10) Patent No.: US 6,499,770 B1
(45) Date of Patent: Dec. 31, 2002

(54) FLEXIBLE DUCT FOR A MICROTURBINE

(75) Inventors: David G. Glista, Durham, NH (US); Andrew J. Olsen, Amesbury, MA (US)

(73) Assignee: Ingersoll-Rand Energy Systems Corporation, Portsmouth, NH (US)

( * ) Notice: Subject to any disclaimer, the term of this patent is extended or adjusted under 35 U.S.C. 154(b) by 0 days.

(21) Appl. No.: 09/968,264

(22) Filed: Oct. 1, 2001

(51) Int. Cl.7 ................................................. F16L 27/10
(52) U.S. Cl. ....................... 285/223; 285/374; 285/231; 285/233
(58) Field of Search ................................. 285/223, 179, 285/181, 231, 233, 184, 374

(56) References Cited

U.S. PATENT DOCUMENTS

| | | | | |
|---|---|---|---|---|
| 3,438,657 A | * | 4/1969 | Torres | 285/233 |
| 3,596,934 A | * | 8/1971 | De Cenzo | 285/233 |
| 4,317,586 A | * | 3/1982 | Campbell | 285/223 |
| 4,372,584 A | * | 2/1983 | Miller | 285/184 |
| 4,621,840 A | * | 11/1986 | Foster | 285/233 |
| 4,998,755 A | * | 3/1991 | Reeder | 285/181 |
| 5,040,729 A | * | 8/1991 | Carrozza | 285/181 |
| 5,106,129 A | * | 4/1992 | Camacho et al. | 285/233 |

\* cited by examiner

*Primary Examiner*—Lynne H. Browne
*Assistant Examiner*—Aaron Dunwoody
(74) *Attorney, Agent, or Firm*—Michael Best & Friedrich LLP

(57) ABSTRACT

A flexible duct for fluidly communicating between first and second components includes a first duct section with an intake end and an exhaust end. A first joint pivotally couples the intake end to the first component for pivotal movement about a first axis. The flexible duct also includes a second duct section with a first end and a second end. The first end is pivotally coupled to the exhaust end by a second joint, and a third joint pivotally couples the second end to the second component. The second joint is pivotable about a second axis that is generally parallel to the first axis, and the third joint is pivotable about a third axis that is generally perpendicular to the first and second axes.

20 Claims, 4 Drawing Sheets

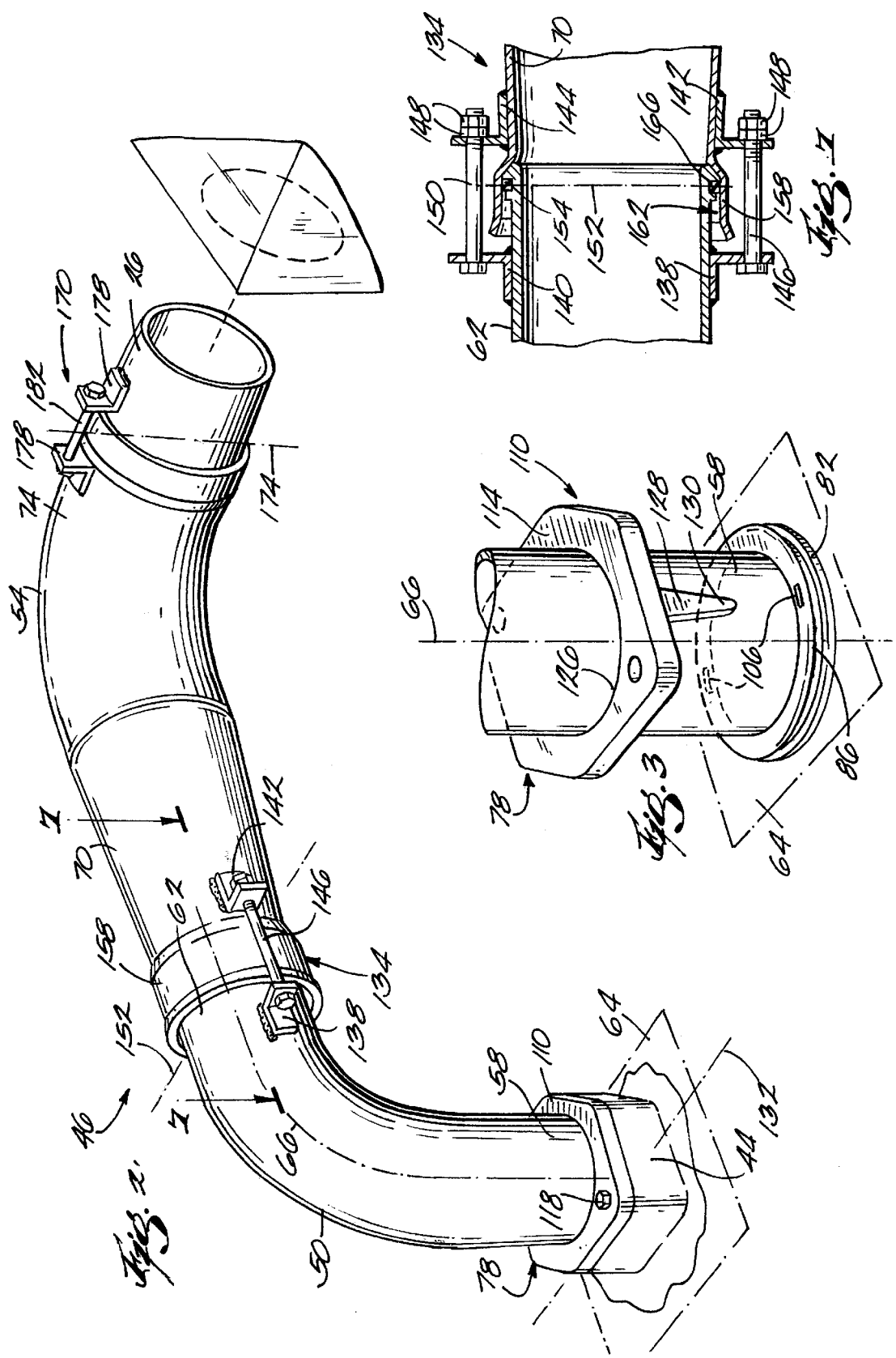

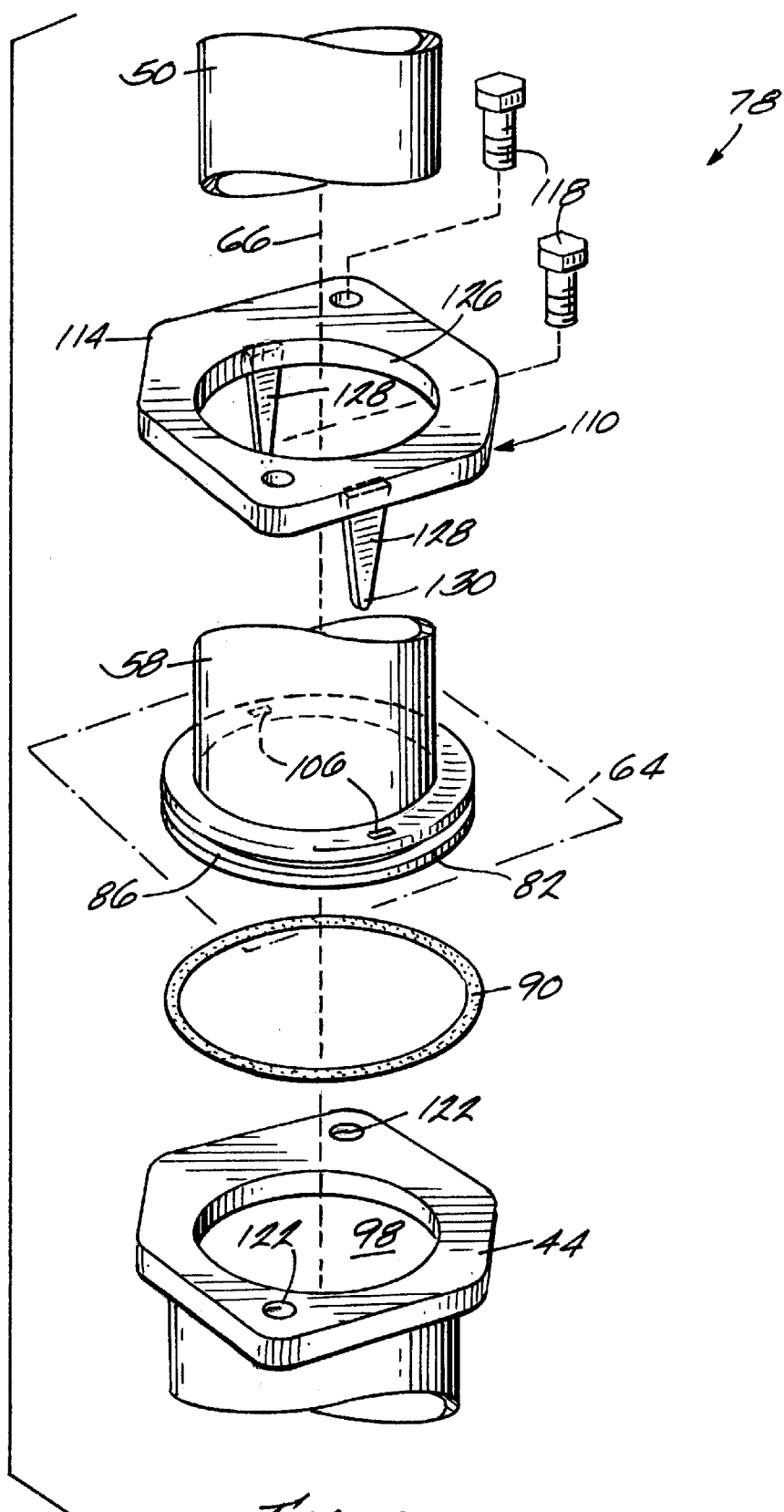

FLEXIBLE DUCT FOR A MICROTURBINE

BACKGROUND OF THE INVENTION

The invention relates to a flexible duct for use in microturbine systems.

SUMMARY

The present invention provides a flexible duct adapted to be secured to first and second components of a thermodynamic system. The duct has a first duct section with an intake end, an exhaust end, and a central axis. A duct-intake plane is defined by the intake end, and a first joint pivotally couples the intake end to the first component. A second duct section has a first end and a second end, and a second joint pivotally couples the first end to the exhaust end of the first duct section. A third joint pivotally couples the second end to the second component.

The first joint permits pivotal movement about a first axis that is generally parallel to the duct-intake plane. The second joint permits pivoting of the first and second sections with respect to each other about a second axis that is generally parallel to the first axis. The third joint permits the second section to pivot with respect to the second component about a third axis that is generally perpendicular to the first axis. The duct is thus configured to provide a substantially air-tight conduit for fluid flow between the first and second components of the thermodynamic system.

The first joint may include a plate that is mounted to the first component, and a pair of pivot tabs that depend generally perpendicularly away from the plate. The tabs may also be generally parallel to, and on opposite sides of, the central axis, such that the first axis extends through both the pivot tabs and the central axis. The pivot tabs may each include a rounded distal end, and the intake end may include a flange. Preferably, the flange has recesses that are configured to receive the distal ends of the pivot tabs to provide pivotal movement of the first duct section with respect to the first component about the first axis. More specifically, the intake end rocks on the distal ends of the pivot tabs.

The first duct section may further include a circumferential groove surrounding the intake end, and the duct may further include a resilient O-ring. Preferably, the O-ring is retained within the groove and engages the first component to provide a substantially air-tight seal between the first component and the first duct section.

The second joint may include first and second mounting members that are affixed at diametrically-opposed positions on the exhaust end of the first duct section; similarly, third and fourth mounting members may be affixed at diametrically opposed positions on the first end of the second duct section. Preferably, the third and fourth mounting members are aligned with the first and second mounting members respectively. The second joint may also include a first tie rod that couples the first and third mounting members and a second tie rod that couples the second and fourth mounting members. The tie rods are preferably substantially parallel to each other. The second joint preferably enables relative pivotal movement between the exhaust end and the first end about the second axis, and the second axis is preferably generally perpendicular to the first and second tie rods.

The first end of the second duct section may include an expanded portion, and the exhaust end may be inserted into the expanded portion. The flexible duct may also include an additional resilient O-ring that snugly engages the first end and the exhaust end to maintain an air-tight seal between the first and second duct sections as the first and second duct sections pivot with respect to each other. Preferably, a circumferential groove surrounds the exhaust end and faces generally away from the central axis such that the O-ring may be retained within the circumferential groove.

Other features and advantages of the invention will become apparent to those skilled in the art upon review of the following detailed description, claims, and drawings.

BRIEF DESCRIPTION OF THE DRAWINGS

FIG. 2 is an enlarged perspective view of the flexible duct.

FIG. 3 is an enlarged view of the intake end of the flexible duct.

FIG. 4 is an enlarged exploded view of the first joint of the flexible duct.

FIG. 7 is a section view taken along line 7—7 of FIG. 2.

Figure 1:
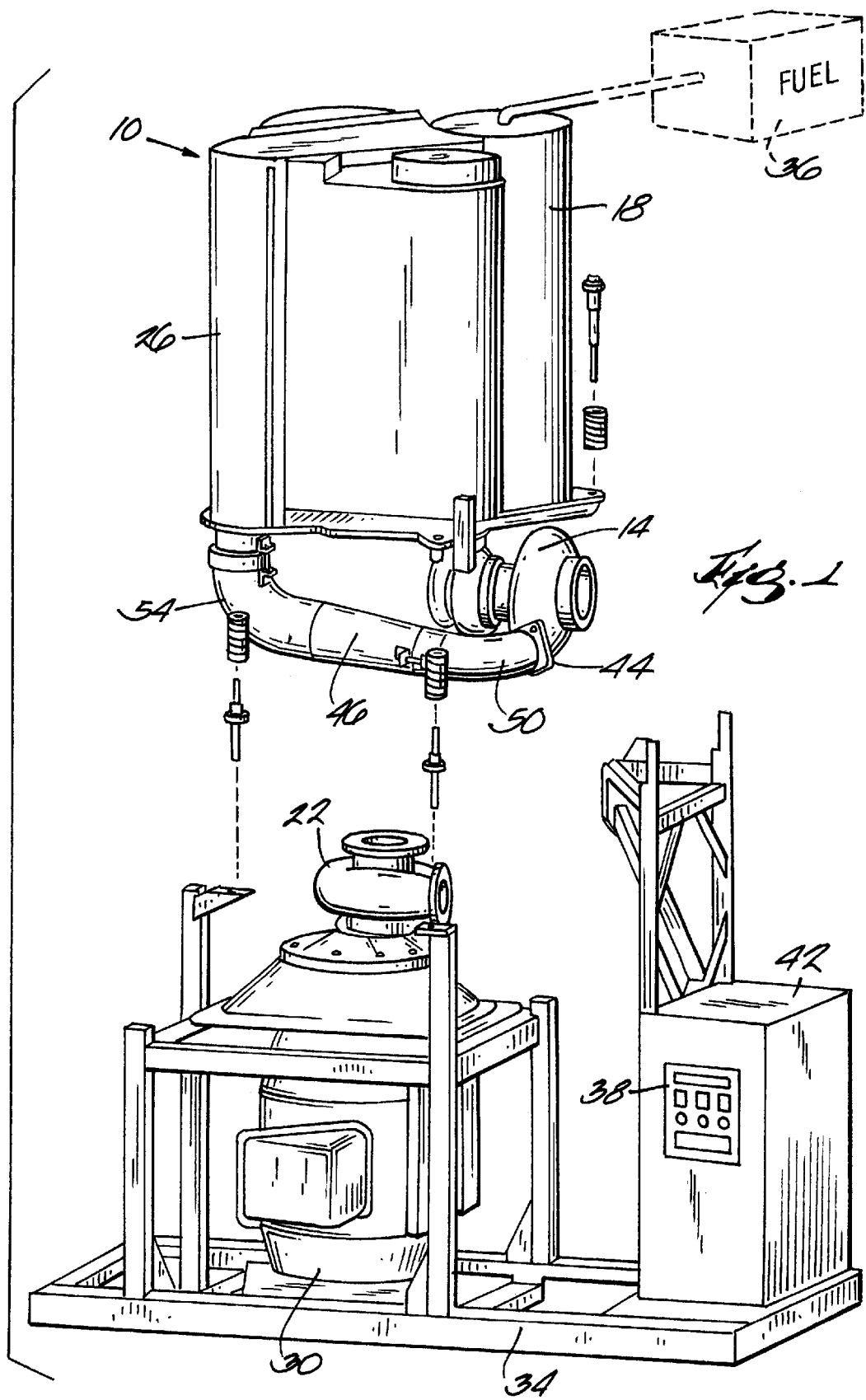
FIG. 1 is a partially exploded perspective view of a microturbine system with a flexible duct of the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates an exemplary thermodynamic system in the form of a microturbine system 10 embodying the invention. The system 10 includes a compressor 14, a combustion section 18, a turbine 22, a recuperator 26, a generator 30, a frame 34, a fuel supply 36, and a control system 38. While many arrangements of these components are possible, in the current embodiment of the invention the recuperator 26 is mounted above the turbine 22.

While the invention is illustrated and further discussed below as being embodied in a microturbine system, the invention is not limited to such an application. For example, the invention may be embodied in other thermodynamic systems such as jet engines, various types of automotive engines, air compressors, other types of turbine systems (e.g. steam turbines) or any other system or device requiring or using a flexible duct.

The frame 34 is constructed of steel or other known materials and should be capable of rigidly supporting the components of the system. The frame 34 also includes an electrical cabinet 42 containing the control system 38.

The generator 30 is attached to the frame 34 and is coupled to the turbine 22. When driven by the turbine 22, the generator 30 produces an electrical power output at a desired voltage and frequency. The system 10 can use many types of known generators 30, however permanent magnet generators are preferred. The choice of specific generators is based on the desired power output, the output characteristics (voltage and frequency), and the expected duty cycle of the equipment.

The compressor 14 is preferably a single stage radial flow compressor of known design, driven either directly or indirectly by the turbine 22. The compressor 14 pulls in atmospheric air along its central axis, compresses the air to a pressure in the range of 3 to 5 atmospheres, and then discharges the compressed air through a compressor discharge 44. From the compressor 14, the air flows through a flexible duct 46 to the cold side of the recuperator 26.

The recuperator 26 is preferably a crossflow heat exchanger having a hot gas flow path and a cold gas flow path. The hot gas flow path receives a gas supply from the turbine 22 at one end, and discharges the gas to the atmosphere at the other end. The cold gas flow path receives its gas from the compressor discharge 44 via the duct 46. The cold gas is heated as it flows through the recuperator 26, and is then discharged into the combustion section 18. Preheating the combustion gas with the turbine exhaust gas before combustion results in a substantial efficiency improvement.

In the combustion section 18, the preheated, compressed air is mixed with a fuel (e.g. natural gas) from the fuel supply 36. Ignition of the fuel-air mixture within the combustion chamber produces an increase in temperature and gas volume. By controlling the fuel flow to the combustion section 18, the system 10 is capable of maintaining a desired power output and exhaust gas temperature. The hot exhaust gas exits the combustion section 18 and flows to the turbine 22.

In the turbine 22, the hot exhaust gas expands, thereby rotating the turbine 22, which drives the compressor 14 and the generator 30. The turbine 22 is preferably a single stage radial flow turbine of known design capable of operating in the microturbine environment. A temperature drop is associated with the expansion of the hot exhaust gas, however the temperature of the gas as it exits the turbine 22 is still relatively high. The turbine exhaust gas then flows to the hot side of the recuperator 26 and enters the hot gas flow path described above.

Certain components of the system 10, including the turbine 22 and the recuperator 26 are exposed to the hot gas flow and may experience large temperature changes. These components will expand and contract in response to their temperature changes, causing them to move or shift with respect to each other. The flexible duct 46 allows the recuperator 26 and the compressor 14 to shift with respect to each other while maintaining a substantially air-tight conduit for the flow of compressed air from the compressor discharge 44 to the recuperator cold gas inlet. While the flexible duct 46 as thus far described fluidly interconnects a recuperator and a compressor, the duct 46 may alternatively be used to fluidly interconnect components of other systems, and is useful in substantially any application in which the fluidly interconnected components move with respect to each other.

Referring now to FIG. 2, the flexible duct 46 includes a first duct section 50 and a second duct section 54. The first duct section 50 includes an intake end 58 coupled to the compressor discharge 44 and an exhaust end 62. A duct-intake plane 64 extends across the intake end 58, and a central axis 66 extends the length of the first duct section 50. The second duct section 54 includes a first end 70 coupled to the exhaust end 62, and a second end 74 coupled to the recuperator 26. Compressed air generally flows into the intake end 58 from the compressor discharge 44 and through the flexible duct 46 until it exits the duct 46 at the second end 74 and enters the cold gas inlet of the recuperator 26.

Referring now also to FIGS. 3–6, a first joint 78 pivotally couples the intake end 58 to the compressor discharge 44 and includes a flange 82 located on the intake end 58 of the first duct section 50. The flange 82 includes a circumferential groove 86 opening generally away from the central axis 66. A resilient O-ring 90 is positioned in the groove 86. The intake end 58 is inserted into the compressor discharge 44 until the flange 82 abuts an internal shoulder 94 within the compressor discharge 44. The O-ring 90 engages an inner wall 98 of the compressor discharge 44 and forms a substantially air-tight seal between the first duct section 50 and the compressor 14. The flange 82 also includes a pair of recesses 106 on opposite sides of the central axis 66.

The first joint 78 also includes a clamp 110. The clamp 110 includes a plate 114 mounted to the compressor discharge 44 by bolts 118 that are threaded into threaded bores 122 of the compressor discharge 44 as shown in FIG. 2, however other fastening means are possible. The plate 114 is generally flat and defines a central opening 126 through which the intake end 58 extends. A small amount of clearance is provided between the central opening 126 and the intake end 58, allowing the duct 46 to pivot as described below. The clamp 110 also includes pivot tabs 128 depending generally perpendicularly from the plate 114 on opposite sides of the central axis 66. The pivot tabs 128 are generally wedge shaped and include rounded distal ends 130. The pivot tabs 128 extend into the compressor discharge 44 and engage the recesses 106. As shown in FIG. 2, when the duct 46 is mounted to the compressor discharge 44, the flange 82 and pivot tabs 128 are within the compressor discharge 44 and hidden from view.

Figure 6:
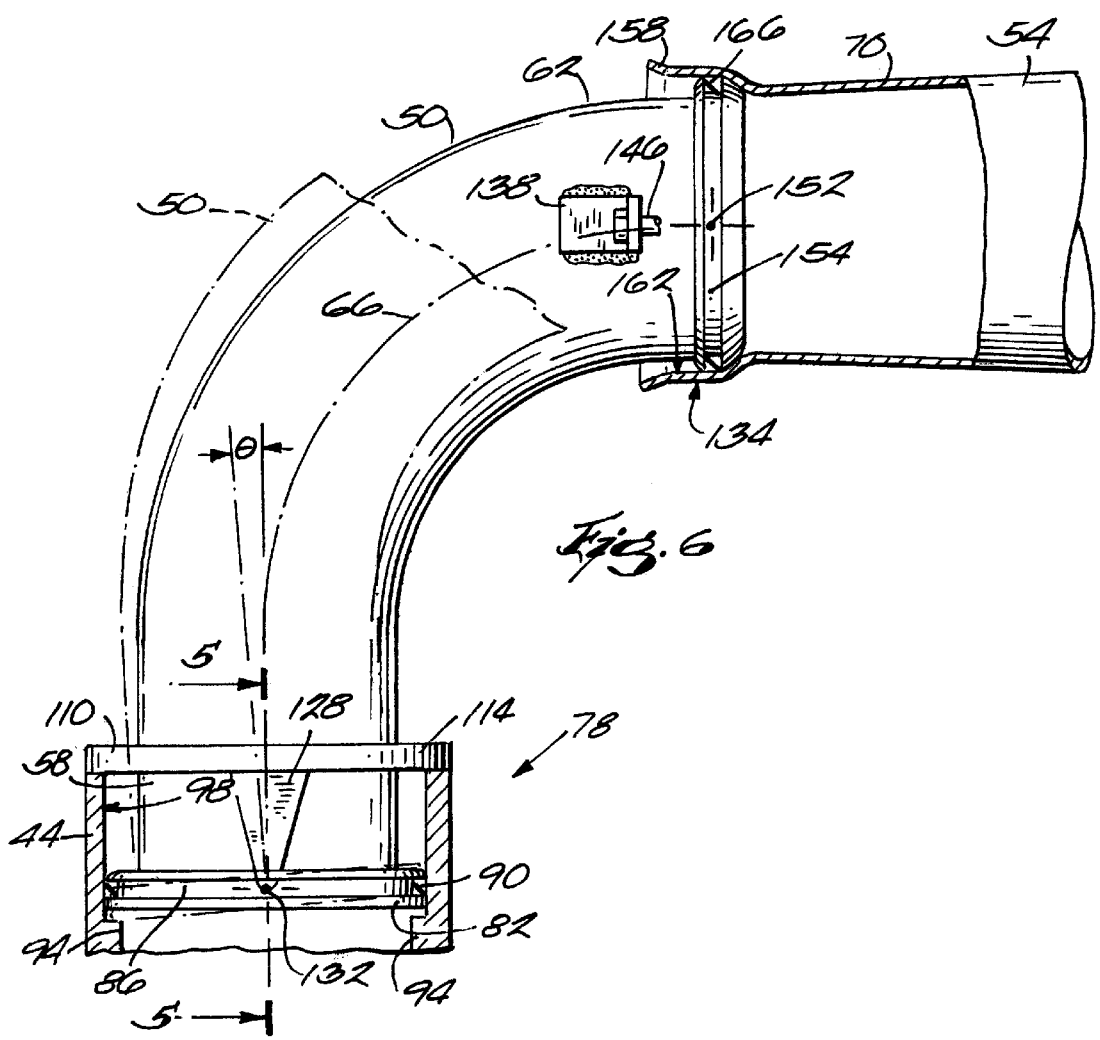
FIG. 6 is an enlarged view of a portion of the flexible duct.
Figure 5:
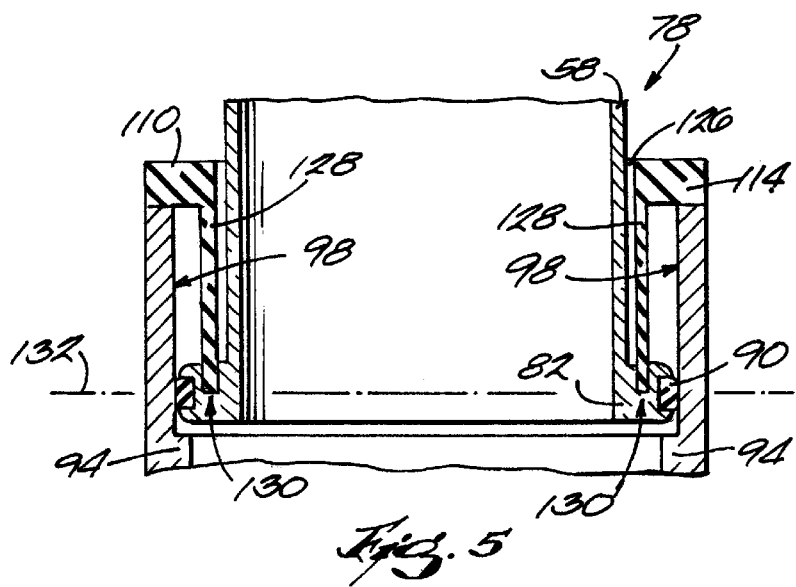
FIG. 5 is a section view taken along line 5—5 of FIG. 6.

The first joint 78 is configured such that there is a relatively small amount of clearance between the flange 82, the internal shoulder 94, and the rounded distal ends 130. This clearance, in combination with the resilient O-ring 90 and the clearance between the intake end 58 and the central opening 126, allows the duct 46 to pivot with respect to the compressor discharge 44 while maintaining a substantially air-tight seal. In particular, the duct 46 may pivot about a first axis 132 that is substantially parallel to the duct-intake plane 64 and extends through the rounded distal ends 130. Referring specifically to FIG. 6, pivotal movement about the first axis 132 (normal to the page in FIG. 6) is provided by rocking the intake end 58 on the rounded distal ends 130. This pivotal movement causes the central axis 66 to move an angle θ away from perpendicular with respect to the duct-intake plane 64 in the vicinity of the intake end 58. As a result, the duct 46 moves to a slightly misaligned position (shown in phantom in FIG. 6) with respect to the compressor discharge 44. The pivot tabs 128, recesses 106, and groove 86, are all configured such that the O-ring 90 is substantially aligned with the first axis 132, thereby preventing excessive pinching of the O-ring 90 as the first section 50 pivots with respect to the compressor discharge 44.

Referring now specifically to FIGS. 6 and 7, a second joint 134 pivotally couples the first and second duct sections 50, 54. The second joint 134 includes first and second L-shaped mounting members 138, 140 mounted to the exhaust end 62. The first and second members 138, 140 are generally diametrically opposed to each other with respect to the first duct section 50. Third and fourth mounting members 142, 144 are mounted to the first end 70. The third and fourth members 142, 144 are also diametrically opposed to each other and are aligned with the first and second 138, 140 mounting members respectively. A first elongated tie rod 146 extends through holes in the first and third members 138, 142, connecting the members 138, 142 to each other. Jam nuts 148 are used to properly space the mounting members 138, 142 from each other. A second elongated tie rod 150 extends through holes in the second and fourth mounting members 140, 144, connecting the members 140, 144 to each other. Jam nuts 148 are also used on the second tie rod 150. The tie rods 146, 150 are substantially identical to each other and are also arranged to be generally parallel to each other as well as to the central axis 66 in the vicinity of the exhaust end 62. The second joint 134 is configured to allow the first and second duct sections 50, 54 to pivot with respect to each other about a second axis 152. The second axis 152 generally extends through and is perpendicular to the first and second tie rods 146, 150. As illustrated in FIG. 6, The second axis 152 is also generally parallel to the first axis 132, however, it should be appreciated that the mounting members 138, 142, and 140, 144 may be relocated to other diametrically-opposed radial positions, allowing pivotal movement about an axis not necessarily parallel to the first axis 132.

The exhaust end 62 includes a circumferential groove 154 opening generally away from the central axis 66. The first end 70 includes an expanded portion 158 having an inner surface 162. The exhaust end 62 is inserted into the expanded portion 158, and a resilient O-ring 166 is retained within the groove 154 and snugly engages the inner surface 162. The O-ring 166 is preferably aligned with the second axis 152 and maintains a substantially air-tight seal between the first and second duct sections 50, 54 as the exhaust end 62 and the first end 70 pivot about the second axis 152. While it is preferred to have the exhaust end 62 inserted into the first end 70, it should be apparent that the components may be reconfigured such that the first end 70 is inserted into the exhaust end 62. It should also be appreciated that the groove 154 may be part of either the exhaust end 62 (as illustrated) or the first end 70.

Referring back to FIG. 2, a third joint 170, configured similarly to the second joint 134, pivotally couples the second end 74 to the recuperator 26, such that the second duct section 54 pivots with respect to the recuperator 26 about a third axis 174. The third joint 170 includes L-shaped mounting members 178 and elongated tie rods 182 (only one tie rod is shown in the figure) substantially identical to those found in the second joint 134. Similarly to the second axis 152, the third axis 174 is generally perpendicular to, and passes through the tie rods 182 of the third joint 170. As illustrated, the third axis 174 is generally perpendicular to the duct-intake plane, however the third joint 170 may be altered in a similar way as the second joint 134 to provide pivotal movement about an axis not necessarily perpendicular to the duct-intake plane 64.

The third joint 170 also includes a resilient O-ring (not shown) aligned with the third axis 174 and positioned between the second end 74 and the recuperator 26, thereby forming a substantially air-tight seal therebetween. As described herein, the flexible duct 46 provides pivotal motion about a plurality of non-collinear axes while maintaining a substantially air-tight conduit for fluid flow between the compressor discharge 44 and the recuperator 26.

The three joints 78, 134, and 170 permit the duct 46 to accommodate thermal expansion and contraction of the various microturbine components by flexing about the three pivot axes 132, 152, and 174. The duct 46 also maintains a substantially air-tight seal during such thermal distortion, due to the resilient O-rings in the joints.

It should be noted that the above-described duct and joints are particularly suited for the working environment of a microturbine system. For example, testing has indicated that the duct 46 is capable of 80,000 hours of operation while conducting heated gasses of approximately 300 to 400 degrees Fahrenheit between the compressor 14 and recuperator 26. The unique configuration of the duct 46 allows approximately 0.5 inches of lateral and vertical displacement between the compressor discharge 44 and the recuperator 26 inlet over a 30 inch length of duct. The lateral and vertical displacement provided by the duct 46 reduces strain loads on the compressor 14, the recuperator 26, and the duct 46 itself that would otherwise be induced by thermal displacement and distortion of these components. The flexibility of the duct 46 also reduces vibration-induced component damage throughout the variety of operating frequencies found in the microturbine environment. Additionally, in the event of a leak somewhere in the microturbine, the duct 46, and particularly the joints 78, 134, 170, are capable of withstanding the extremely hot gasses (as high as 1200°) that may impinge on the outer surface of the duct 46, a situation that would destroy traditional flexible conduits. While the O-ring 166 alone can withstand temperatures of about 350° F., the joints 78, 134, 170 are capable of shielding the O-ring 166 from the excessive temperatures of the leaking gasses, and the O-ring would therefore likely remain intact.

The second and third joints 134, 170 also provide, to a lesser degree, flexibility in directions not necessarily associated with their respective pivot axes 152, 174. For example the first and second duct sections 50, 54 may pivot slightly with respect to each other about an axis perpendicular to the pivot axis 152. In this example, one of the tie rods 146, 150 would be in an increased state of tension, while the other would carry substantially no tensile load whatsoever. Alternatively, the duct sections 50, 54 may twist slightly with respect to each other. Each of these examples further illustrates the duct's ability to withstand thermally induced strain loads-while improving the manufacturability of the microturbine system 10 by compensating for tolerance stack-up and misalignment of other microturbine components.

What is claimed is:

1. A flexible duct adapted for use in a thermodynamic system having first and second components that are moveable with respect to each other, said duct comprising:

a first duct section having an intake end, an exhaust end, and a central axis;

a duct-intake plane defined by said intake end;

a first joint pivotally coupling said intake end to the first component;

a second duct section having a first end and a second end;

a second joint pivotally coupling said first end to said exhaust end; and a third joint pivotally coupling said second end to the second component;

wherein said first joint permits pivotal movement of said first duct section with respect to the first component about a first axis that is generally parallel to said duct-intake plane, wherein said second joint permits pivoting of said first and second sections with respect to each other about a second axis generally parallel to said first axis, wherein said third joint permits said second section to pivot with respect to the second component about a third axis that is generally perpendicular to said first axis, and wherein said duct provides a substantially air-tight conduit for fluid flow between the first component and the second component, even as the first and second components move with respect to each other.

2. The flexible duct of claim 1, wherein said first joint includes a plate mounted to the first component, and a pair of pivot tabs depending generally perpendicularly away from said plate and generally parallel to and on opposite sides of said central axis, and wherein said first axis extends through said pivot tabs and said central axis.

3. The flexible duct of claim 2, wherein said pivot tabs each include a distal end, and wherein said intake end includes a flange, said flange having recesses receiving said distal ends of said pivot tabs to permit said intake end to rock upon said distal ends of said pivot tabs.

4. The flexible duct of claim 1, wherein said first duct section includes a circumferential groove surrounding said intake end, said duct further comprising a resilient O-ring retained within said groove and engaging the first component to provide a substantially air-tight seal between the first component and said first duct section.

5. The flexible duct of claim 1, wherein said second joint includes first and second mounting members affixed at diametrically-opposed positions on said first duct section, and third and fourth mounting members affixed at diametrically opposed positions on said second duct section, said third and fourth mounting members being aligned with said first and second mounting members respectively, said second joint further including a first tie rod coupling said first and third mounting members and a second tie rod coupling said second and fourth mounting members, said tie rods being substantially parallel to each other, and wherein said second joint enables relative pivotal movement between said exhaust end and said first end about said second axis, said second axis being generally perpendicular to said first and second tie rods.

6. The flexible duct of claim 1, wherein said first end includes an expanded portion, and wherein said exhaust end is inserted into said expanded portion, said flexible duct further comprising a resilient O-ring snugly engaging said first end and said exhaust end to maintain an air-tight seal between said first and second duct sections as said first and second duct sections pivot with respect to each other.

7. The flexible duct of claim 6, wherein said first duct section includes a circumferential groove surrounding said exhaust end and facing generally away from said central axis, and wherein said O-ring is retained within said circumferential groove.

8. The flexible duct of claim 6, wherein said O-ring defines an O-ring plane and said second axis lies in said O-ring plane.

9. The flexible duct of claim 1, wherein said third axis is generally perpendicular to said duct-intake plane.

10. A microturbine system for the generation of electricity, the microturbine system comprising:

a compressor having a compressor discharge allowing compressed air to flow out of the compressor;

a recuperator having a recuperator inlet communicating with said compressor discharge to receive the compressed air;

a combustor communicating with said recuperator to receive the compressed air therefrom and to combust the compressed air with a fuel to create products of combustion;

a turbine communicating with said combustor, said turbine rotatably driving a generator in response to expansion of the products of combustion flowing out of said combustor;

a first duct section having an intake end, an exhaust end, and a central axis;

a duct-intake plane defined by said intake end;

first joint pivotally coupling said intake end to said compressor discharge.;

a second duct section having a first end and a second end;

a second joint pivotally coupling said first end to said exhaust end; and a third joint pivotally coupling said second end to said recuperator inlet;

wherein said first joint permits pivotal movement of said first duct section with respect to the compressor discharge about a first axis that is generally parallel to said duct-intake plane, wherein said second joint permits pivoting of said first and second sections with respect to each other about a second axis generally parallel to said first axis, wherein said third joint permits said second section to pivot with respect to said recuperator inlet about a third axis that is generally perpendicular to said first axis, wherein said duct provides a substantially air-tight conduit for fluid flow between said compressor discharge and said recuperator inlet, and wherein upon thermal distortion of said recuperator, said duct sections pivot about at least one of said axes.

11. The microturbine system of claim 10, wherein said first joint includes a plate mounted to said compressor discharge, and a pair of pivot tabs depending generally perpendicularly away from said plate and generally parallel to and on opposite sides of said central axis, and wherein said first axis extends through said pivot tabs and said central axis.

12. The microturbine system of claim 11, wherein said pivot tabs each include a distal end, and wherein said intake end includes a flange, said flange having recesses receiving said distal ends of said pivot tabs to permit said intake end to rock upon said distal ends of said pivot tabs.

13. The microturbine system of claim 10, wherein said first duct section includes a circumferential groove surrounding said intake end, said microturbine system further comprising a resilient O-ring retained within said groove and engaging the compressor discharge to provide a substantially air-tight seal between the compressor discharge and said first duct section.

14. The microturbine system of claim 10, wherein said second joint includes first and second mounting members affixed at diametrically-opposed positions on said first duct section, and third and fourth mounting members affixed at diametrically opposed positions on said second duct section, said third and fourth mounting members being aligned with said first and second mounting members respectively, said second joint further including a first tie rod coupling said first and third mounting members and a second tie rod coupling said second and fourth mounting members, said tie rods being substantially parallel to each other, and wherein said second joint enables relative pivotal movement between said first and second duct sections about said second axis, said second axis extending through and being generally perpendicular to said first and second tie rods.

15. The microturbine system of claim 10, wherein said first end includes an expanded portion, and wherein said exhaust end is inserted into said expanded portion, said microturbine system further comprising a resilient O-ring snugly engaging said first end and said exhaust end to maintain an air-tight seal between said first and second duct sections as said first and second duct sections pivot with respect to each other.

16. The microturbine system of claim 15, wherein said first duct section includes a circumferential groove surrounding said exhaust end and facing generally away from said central axis, and wherein said O-ring is retained within said circumferential groove.

17. The microturbine system of claim 15, wherein said O-ring defines an O-ring plane, and said second axis lies in said O-ring plane.

18. A flexible duct adapted for use on a thermodynamic system, said duct securable at one end to a first component and at another end to a second component, said duct comprising:

a first duct section having an intake end and an exhaust end, the intake end being mounted to the first component;

a second duct section having a first end and a second end, said first end including an expanded portion that receives said exhaust end, and the second end being mounted to the second component;

a joint pivotally coupling said exhaust end and said first end, said joint including first and second mounting members affixed at diametrically opposed positions on said first duct section, and third and fourth mounting members affixed at diametrically opposed positions on said second duct section, said third and fourth mounting members being aligned with said first and second mounting members respectively, said joint further including a first elongated tie rod coupling said first and third mounting members, and a second elongated tie rod coupling said second and fourth mounting members, wherein said first and second tie rods are substantially parallel to each other, and wherein said first and second duct sections pivot with respect to each other at said joint about a pivot axis that passes through and is substantially perpendicular to said first and second tie rods.

19. The flexible duct of claim 18, further comprising a resilient O-ring snugly engaged between said first and second duct sections to maintain a substantially air-tight seal between said first and second duct sections as said first and second duct sections pivot about said pivot axis.

20. The flexible duct of claim 19, wherein said O-ring defines an O-ring plane, and said pivot axis lies in said O-ring plane.

* * * * *